(12) United States Patent
Kubota

(10) Patent No.: US 11,531,255 B2
(45) Date of Patent: Dec. 20, 2022

(54) PROJECTOR, PROJECTION OPTICAL DEVICE, AND METHOD OF CONTROLLING PROJECTOR

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 90 days.

(21) Appl. No.: 17/105,887

(22) Filed: Nov. 27, 2020

(65) Prior Publication Data

US 2021/0165309 A1 Jun. 3, 2021

(30) Foreign Application Priority Data

Nov. 29, 2019 (JP) .............................. JP2019-216680

(51) Int. Cl.
  *G03B 21/14* (2006.01)
  *G03B 21/20* (2006.01)
(52) U.S. Cl.
  CPC ......... *G03B 21/142* (2013.01); *G03B 21/208* (2013.01); *G03B 21/2033* (2013.01)
(58) Field of Classification Search
  CPC .. G03B 21/14; G03B 21/142; G03B 21/2033; G03B 21/208; H04N 9/31; H04N 9/3179
  USPC ....................................................... 353/119
  See application file for complete search history.

(56) References Cited

U.S. PATENT DOCUMENTS

| 7,896,506 | B2* | 3/2011 | Abe ..................... | G02B 27/022 |
| | | | | 348/222.1 |
| 8,023,029 | B2* | 9/2011 | Joseph .................. | G03B 17/00 |
| | | | | 348/333.01 |
| 8,104,899 | B2* | 1/2012 | Ha ....................... | G03B 21/145 |
| | | | | 353/30 |
| 11,259,013 | B2* | 2/2022 | Ma ....................... | H04N 17/002 |
| 2013/0044257 | A1* | 2/2013 | Chien ................. | H04M 1/0264 |
| | | | | 348/E5.025 |
| 2016/0329006 | A1 | 11/2016 | Weber et al. | |
| 2021/0168341 | A1* | 6/2021 | Kubota ................ | H04N 5/2257 |

FOREIGN PATENT DOCUMENTS

| JP | 2004-163816 A | 6/2004 |
| JP | 2004-347871 A | 12/2004 |
| JP | 2006-201494 A | 8/2006 |
| JP | 2009-223490 A | 10/2009 |
| JP | 2016-92779 A | 5/2016 |

* cited by examiner

Primary Examiner — William C. Dowling
(74) Attorney, Agent, or Firm — Dority & Manning, P.A.

(57) ABSTRACT

A projector includes a projector main body including an optical unit for generating an image light beam, and a projection optical device attached to a mounting part of the projector main body, and projecting the image light beam generated by the optical unit on a screen, a chassis of the projection optical device includes a camera attachment part to which a camera is attached, and an imaging range of the camera attached to the camera attachment part includes at least a part of a projection image projected by the projection optical device.

18 Claims, 9 Drawing Sheets

PROJECTOR, PROJECTION OPTICAL DEVICE, AND METHOD OF CONTROLLING PROJECTOR

The present application is based on, and claims priority from JP Application Serial Number 2019-216680, filed Nov. 29, 2019, the disclosure of which is hereby incorporated by reference herein in its entirety.

BACKGROUND

1. Technical Field

The present disclosure relates to a projector, a projection optical device, and a method of controlling a projector.

2. Related Art

There are known a variety of technologies for adjusting a projection image of a projector based on a taken image of a camera.

For example, in JP-A-2004-347871 (Document 1), there is described a projector provided with a main body of the projector, a projection lens, and a control section, wherein a digital camera is detachably attached to the main body, the projection lens is attached to the main body of the projector to perform irradiation with displaying data, and the control section projects an automatic white balance adjusting chart from the projection lens when the digital camera is attached, and at the same time, performs a white balance adjustment of the displaying data to be projected from the projection lens based on color signals from the digital camera which has taken an image of the automatic white balance adjusting chart thus projected.

In the projector described in Document 1, it becomes possible to easily perform the adjustment of the projection image such as the white balance adjustment.

However, in the projector described in Document 1, when a projection optical device for projecting image light generated in an optical unit on a projection surface is installed in the main body of the projector, there is a possibility that it becomes difficult for the camera to take the projection image. For example, when a so-called "flexion-type projection optical device" is installed in the main body of the projector, there is a possibility that it becomes difficult for the camera to take the projection image. As a result, there is a possibility that it becomes difficult for the projector to perform the adjustment of the projection image.

SUMMARY

An aspect for solving the problem described above is directed to a projector including a projector main body including an optical unit configured to generate an image light beam, and a projection optical device attached to a mounting part of the projector main body, configured to project the image light beam generated by the optical unit on a projection surface, and a chassis of the projection optical device includes a first attachment part to which an imaging device is attached, wherein an imaging range of the imaging device attached to the first attachment part includes at least a part of a projection image projected by the projection optical device.

In the projector described above, the projection optical device may be configured to detachably be attached to the projector main body.

In the projector described above, the projection optical device may include a first projection optical device and a second projection optical device, the first projection optical device may form a first light path, the second projection optical device may form a second light path different from the first light path, the first projection optical device may project the image light beam in a first direction when the first projection optical device is attached to the projector main body, and the second projection optical device may project the image light beam in a second direction different from the first direction when the second projection optical device is attached to the projector main body.

In the projector described above, the first attachment part may be configured so that the imaging device is detachably be attached to the first attachment part.

In the projector described above, the first attachment part may be disposed in the chassis of the projection optical device at a side from which the image light beam is projected.

In the projector described above, the first attachment part may be disposed in the chassis of the projection optical device at a side distant from the projector main body.

In the projector described above, the projector main body may include a second attachment part to which the imaging device is attached, and an imaging area of the imaging device attached to the second attachment part may include at least a part of the projection image derived from the image light beam projected by the projection optical device.

Another aspect for solving the problem described above is directed to a projection optical device including an optical unit configured to generate an image light beam, and configured to project the image light beam generated by the optical unit on a projection surface, and a chassis of the projection optical device includes an attachment part to which an imaging device is attached, wherein the projection optical device to be attached to a mounting part of a projector main body, and an imaging range of the imaging device attached to the attachment part includes at least a part of a projection image projected by the projection optical device.

Still another aspect for solving the problem described above is directed to a method of controlling a projector including making an imaging device attached to an attachment part of a chassis of a projection optical device take an image of a range including at least apart of a projection image projected by the projection optical device when the imaging device is attached to the attachment part, and adjusting an image light projected from the projection optical device based on a taken image by the imaging device, wherein the projector including a projector main body including an optical unit configured to generate an image light beam, and the projection optical device attached to a mounting part of the projector main body, and configured to project the image light beam generated by the optical unit on a projection surface.

DESCRIPTION OF EXEMPLARY EMBODIMENTS

An embodiment of the present disclosure will hereinafter be described with reference to the drawings.

1. Configuration of Display System 1-1. Configuration of Display System in First State FIG. 1 is a diagram showing an example of a configuration of a display system 1 in a first state according to the present embodiment.

Figure 1:
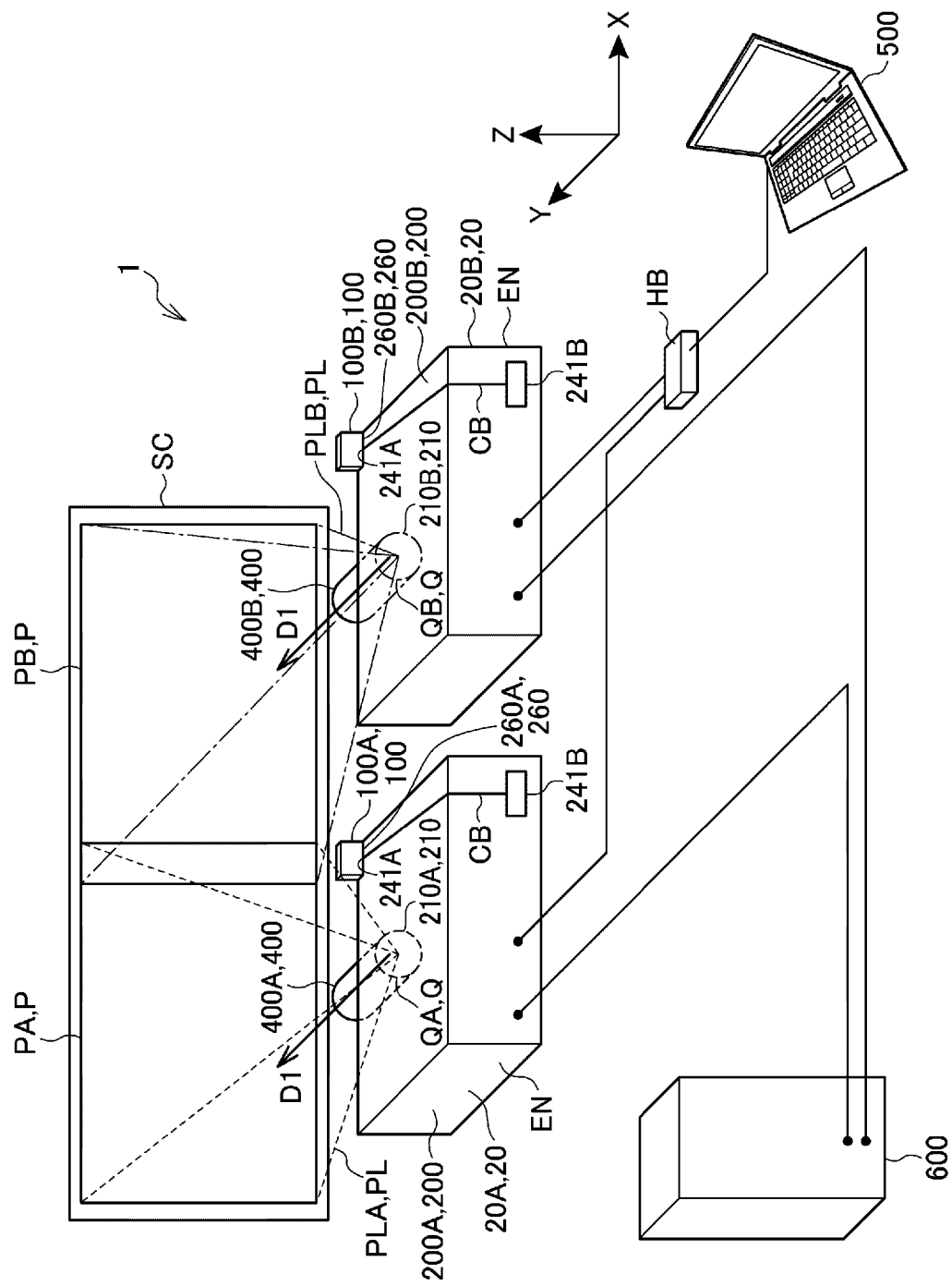
FIG. 1 is a diagram showing an example of a configuration of a display system in a first state according to an embodiment.

In FIG. 1, there are described an X axis, a Y axis, and a Z axis perpendicular to each other. The Z axis represents a vertical direction. The X axis and the Y axis are parallel to a horizontal direction. The X axis represents a left-right direction, and the Y axis represents a front-back direction.

The display system 1 is provided with a projector 200A, a projector 200B, a camera 100A, a camera 100B, a control device 500, and an image supply device 600.

The image supply device 600 is coupled to each of the projector 200A and the projector 200B so as to be able to communicate with the projectors, and transmits image data to each of the projector 200A and the projector 200B. The image supply device 600 is formed of, for example, a personal computer or a DVD (Digital Versatile Disc) player. The image supply device 600 establishes, for example, USB (Universal Serial Bus) connection to each of the projector 200A and the projector 200B with USB cables.

In the present embodiment, the image supply device 600 establishes the USB connection to each of the projector 200A and the projector 200B, but the embodiment of the present disclosure is not limited thereto. The interface for coupling the image supply device 600 to each of the projector 200A and the projector 200B can also be an analog interface such as VGA (Video Graphics Array), D-terminal, or S-terminal. Further, the interface for coupling the image supply device 600 to each of the projector 200A and the projector 200B can also be a digital interface such as DVI (Digital Visual Interface), HDMI (registered trademark; High-Definition Multimedia Interface), Display Port, or HDBaseT (registered trademark). Further, the interface for establishing the connection to the projectors 200 can be a communication interface such as Ethernet (registered trademark) or IEEE 1394.

Further, it is possible for the image supply device 600 to transmit the image data to each of the projector 200A and the projector 200B via wireless communication such as Wi-Fi (registered trademark).

In the display system 1 in the first state, the projector 200A is provided with a projector main body 20A and a projection optical device 400A, and the projector 200B is provided with a projector main body 20B and a projection optical device 400B. The projection optical device 400A is mounted on a mounting part 210A of the projector main body 20A. The projection optical device 400B is mounted on a mounting part 210B of the projector main body 20B.

The projection optical device 400A projects an image light beam PLA in a first direction D1 with reference to the projector main body 20A. In other words, the projection optical device 400A is a so-called "straight projection optical device." The projector 200A projects the image light beam PLA to a screen SC via the projection optical device 400A. The projection optical device 400B projects an image light beam PLB in the first direction D1 with reference to the projector main body 20B. In other words, the projection optical device 400B is a so-called "straight projection optical device." The projector 200B projects the image light beam PLB to the screen SC via the projection optical device 400B. The first direction D1 represents the positive direction in the Y axis in FIG. 1.

The projector 200A is disposed so that the mounting part 210A faces to the positive direction in the Y axis. A projection opening of the projection optical device 400A mounted on the mounting part 210A faces to the positive direction in the Y axis. The projector 200B is disposed so that the mounting part 210B faces to the positive direction in the Y axis. A projection opening of the projection optical device 400B mounted on the mounting part 210B faces to the positive direction in the Y axis. The positive direction in the Y axis represents a direction from each of the projector 200A and the projector 200B toward the screen SC.

The mounting part 210A is provided with an opening QA so that the image light beam PLA generated inside the projector main body 20A can be projected to the outside. In the projector 200A, a surface provided with the opening QA is opposed to the screen SC. The mounting part 210B is provided with an opening QB so that the image light beam PLB generated inside the projector main body 20B can be projected to the outside. In the projector 200B, a surface provided with the opening QB is opposed to the screen SC.

The projection optical device 400A and the projection optical device 400B have respective configurations substantially the same as each other. In the following description, the description of projection optical devices 400 is used in some cases when the projection optical device 400A and the projection optical device 400B are not distinguished from each other.

The projection optical devices 400 each correspond to an example of a "first projection optical device."

The screen SC is disposed on the positive direction side in the Y axis with respect to each of the projector 200A and the projector 200B.

The screen SC corresponds to an example of a "projection surface."

The projector 200A receives the image data from the image supply device 600, and then makes the projection optical device 400A project the image light beam PLA corresponding to the image data thus received to thereby display a projection image PA on the screen SC. The projector 200B receives the image data from the image supply device 600, and then makes the projection optical device 400B project the image light beam PLB corresponding to the image data thus received to thereby display a projection image PB on the screen SC.

In the embodiment of the present disclosure, there will be described when the projection image PA and the projection image PB are displayed side by side, namely so-called tiling display is performed. In the following description, the description of projection images P is used in some cases when the projection image PA and the projection image PB are not distinguished from each other.

The projector 200A has a camera attachment part 260A, and the camera attachment part 260A is attached with the camera 100A. The camera 100A is coupled to the projector 200A so as to be able to communicate with the projector 200A. For example, a connector 241A of the camera 100A is coupled to a connector 241B of the projector main body 20A via a USB cable CB, and thus the camera 100A is coupled to the projector 200A so as to be able to communicate with the projector 200A in compliance with the USB standard.

The projector 200B has a camera attachment part 260B, and the camera attachment part 260B is attached with the camera 100B. The camera 100B is coupled to the projector 200B so as to be able to communicate with the projector 200B. Specifically, a connector 241A of the camera 100B is coupled to a connector 241B of the projector main body 20B via a USB cable CB, and thus the camera 100B is coupled to the projector 200B so as to be able to communicate with the projector 200B in compliance with the USB standard.

The projector 200A and the projector 200B have respective configurations substantially the same as each other. In the following description, the description of projectors 200 is used in some cases when the projector 200A and the projector 200B are not distinguished from each other. Further, the description of camera attachment parts 260 is used in some cases when the camera attachment part 260A and the camera attachment part 260B are not distinguished from each other.

The camera attachment parts 260 each correspond to an example of a "second attachment part," and camera attachment parts 911 described later each correspond to an example of a "first attachment part."

The camera attachment parts 260 are each disposed so that the camera 100 attached to the camera attachment part 260 is capable of taking the projection image P from the projection optical device 400.

The configuration of the projector 200 will be described later with reference to FIG. 3 and FIG. 4.

Although in FIG. 1, there is illustrated an example of floor installation in which each of the projector 200A and the projector 200B is installed on the floor in the negative direction in the Y axis with respect to the screen SC, it is possible to install each of the projector 200A and the projector 200B so as to be suspended from the ceiling. Further, although in the embodiment of the present disclosure, there is illustrated when each of the projector 200A and the projector 200B performs the projection on the screen SC shaped like a plane, the projection target is not limited to the screen SC, but can be a plane such as a wall surface of a building, or can also be a curved surface or an uneven surface.

The camera 100A images an imaging range including the projection image PA to form a taken image. The data representing the taken image is used when the projector 200A adjusts the projection image PA. The adjustment of the projection image PA by the projector 200A includes an adjustment of the size of the projection image PA and the shape of the projection image PA, an adjustment of the colors of the projection image PA and the luminance of the projection image PA, and an adjustment of the tiling display. It should be noted that it is possible for the camera 100A to generate the adjustment data described above.

The camera 100B images an imaging range including the projection image PB to form a taken image. The data representing the taken image is used when the projector 200B adjusts the projection image PB. The adjustment of the projection image PB by the projector 200B includes an adjustment of the size of the projection image PB and the shape of the projection image PB, an adjustment of the colors of the projection image PB and the luminance of the projection image PB, and an adjustment of the tiling display. It should be noted that it is possible for the camera 100B to generate the adjustment data described above.

The camera 100A and the camera 100B have respective configurations substantially the same as each other. In the following description, the description of cameras 100 is used in some cases when the camera 100A and the camera 100B are not distinguished from each other.

The cameras 100 each correspond to an example of an "imaging device."

The configuration of the camera 100 and the camera attachment part 260 will be described later with reference to FIG. 4 and FIG. 5.

The control device 500 is coupled to the projector 200A and the projector 200B so as to be able to communicate with the projectors. Specifically, the control device 500 is coupled to the projector 200A and the projector 200B so as to be able to communicate with the projectors via a network hub HB in compliance with the Ethernet (registered trademark).

The control device 500 is formed of, for example, a personal computer, and outputs instruction information to each of the projector 200A and the projector 200B. The projector 200A and the projector 200B each operate in accordance with the instruction information from the control device 500.

1-2. Configuration of Display System in Second State

Figure 2:
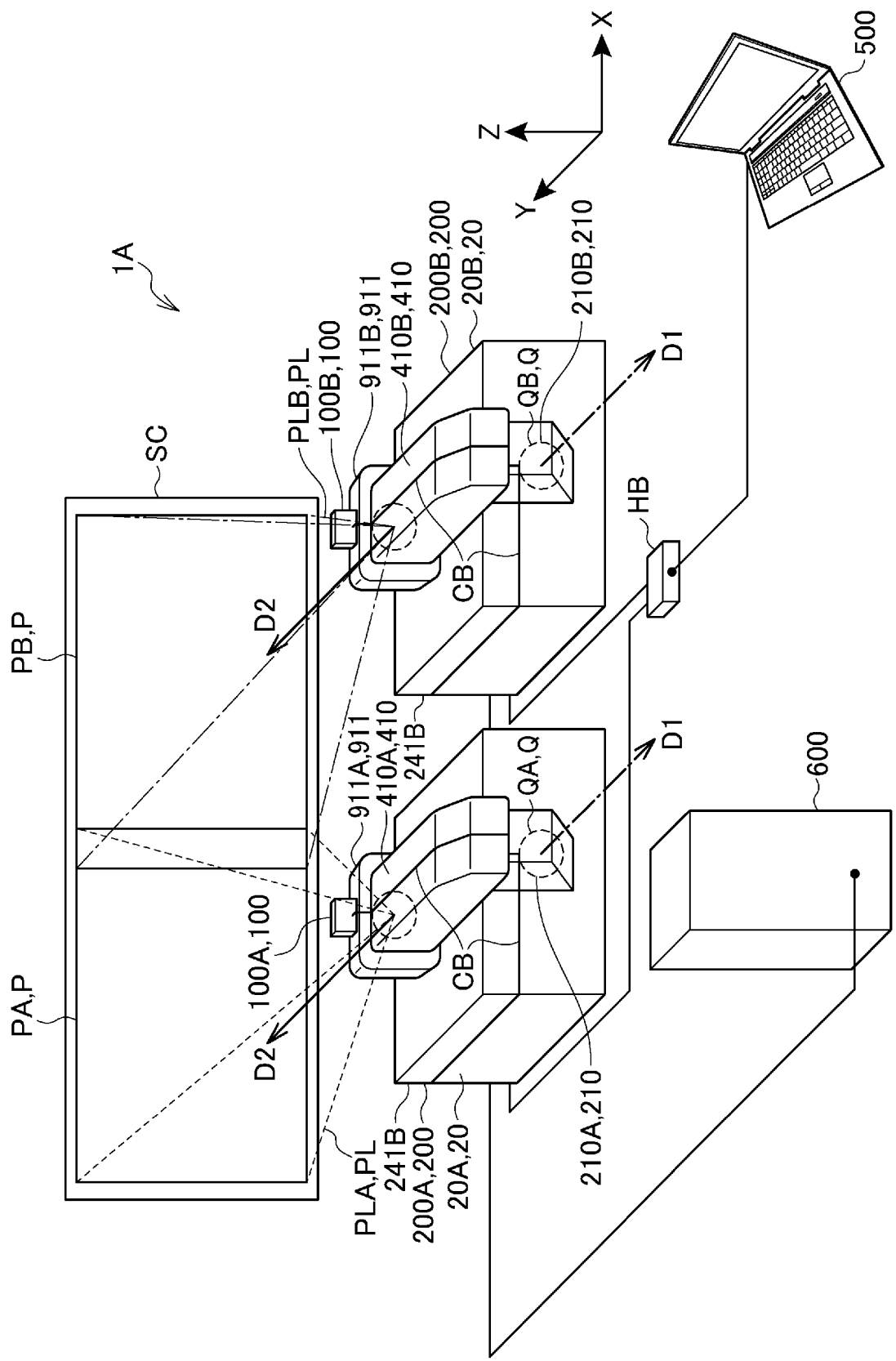
FIG. 2 is a diagram showing an example of a configuration of a display system in a second state according to the embodiment.

FIG. 2 is a diagram showing an example of a configuration of a display system 1A in a second state according to the present embodiment. The display system 1A in the second state is provided with a projector 300A and a projector 300B. The projector 300A is provided with the projector main body 20A and a projection optical device 410A, and the projector 300B is provided with the projector main body 20B and a projection optical device 410B. The projection optical device 410A is mounted on the mounting part 210A of the projector main body 20A. The projection optical device 410B is mounted on the mounting part 210B of the projector main body 20B.

The camera 100A is attached to the projection optical device 410A, and the camera 100B is attached to the projection optical device 410B. Hereinafter, changes in the display device 1A from the display system 1 are mainly described.

The projector 300A and the projector 300B have respective configurations substantially the same as each other. In the following description, the description of projectors 300 is used in some cases when the projector 300A and the projector 300B are not distinguished from each other.

The projector 300A is disposed so that the mounting part 210A faces to the negative direction in the Y axis. A projection opening of the projection optical device 410A mounted on the mounting part 210A faces to the positive direction in the Y axis. The projector 300B is disposed so that the mounting part 210B faces to the negative direction in the Y axis. A projection opening of the projection optical device 410B mounted on the mounting part 210B faces to the positive direction in the Y axis.

The negative direction in the Y axis represents a direction from the screen SC toward the projector 300A and the projector 300B. In the projector 300A, a surface provided with the opening QA is not opposed to the screen SC. In the projector 300B, a surface provided with the opening QB is not opposed to the screen SC.

The projection optical device 410A projects the image light beam PLA in a second direction D2 with reference to the projector main body 20A. In other words, the projection optical device 410A is a so-called "flexion-type projection optical device." The projector 300A projects the image light beam PLA to the screen SC via the projection optical device 410A. The projection optical device 410B projects the image light beam PLB in the second direction D2 with reference to the projector main body 20B. In other words, the projection optical device 410B is a so-called "flexion-type projection optical device." The projector 300B projects the image light beam PLB to the screen SC via the projection optical device 410B. The second direction D2 represents the positive direction in the Y axis in FIG. 2.

The projection optical device 410A and the projection optical device 410B have respective configurations substantially the same as each other. In the following description, the description of projection optical devices 410 is used in some cases when the projection optical device 410A and the projection optical device 410B are not distinguished from each other.

The projection optical devices 410 each correspond to an example of a "second projection optical device."

The screen SC is disposed on the positive direction side in the Y axis with respect to each of the projector 300A and the projector 300B.

The second direction D2 represents the opposite direction to the first direction D1 with reference to the projector 300A. Further, the second direction D2 represents the opposite direction to the first direction D1 with reference to the projector 300B. The first direction D1 represents the negative direction in the Y axis in FIG. 2. The second direction D2 represents the positive direction in the Y axis in FIG. 2.

In the display system 1A in the second state, the camera 100A is detached from the camera attachment part 260A, and is attached to the camera attachment part 911A of the projection optical device 410A. The camera 100A is coupled to the projector 300A so as to be able to communicate with the projector 300A. For example, the connector 241A of the camera 100A is coupled to the connector 241B of the projector main body 20A via a USB cable CB, and thus the camera 100A is coupled to the projector 300A in compliance with the USB standard.

In the display system 1A in the second state, the camera 100B is detached from the camera attachment part 260B, and is attached to the camera attachment part 911B of the projection optical device 410B. The camera 100B is coupled to the projector 300B so as to be able to communicate with the projector 300B. For example, the connector 241A of the camera 100B is coupled to the connector 241B of the projector main body 20B via a USB cable CB, and thus the camera 100B is coupled to the projector 300B in compliance with the USB standard.

The camera attachment parts 911 each correspond to an example of the "first attachment part." Further, the camera attachment parts 911 each correspond to an example of an "attachment part."

The camera attachment parts 911 are each disposed so that the camera 100 attached to the camera attachment part 911 is capable of taking the projection image P from the projection optical device 410.

The camera 100A is disposed on the positive direction side in the Z axis in the projection optical device 410A, and the camera 100B is disposed on the positive direction side in the Z axis in the projection optical device 410B.

In other words, the camera attachment part 911A is disposed in the projection optical device 410A at the side distant from the projector 300A. Further, the camera attachment part 911B is disposed in the projection optical device 410B at the side distant from the projector 300A.

The projection optical device 410A and the projection optical device 410B have respective configurations substantially the same as each other. In the following description, the description of projection optical devices 410 is used in some cases when the projection optical device 410A and the projection optical device 410B are not distinguished from each other. Further, the description of camera attachment parts 911 is used in some cases when the camera attachment part 911A and the camera attachment part 911B are not distinguished from each other.

The configuration of the projection optical device 410 will be described later with reference to FIG. 5 and FIG. 6.

2. Configuration of Projector

Figure 3:
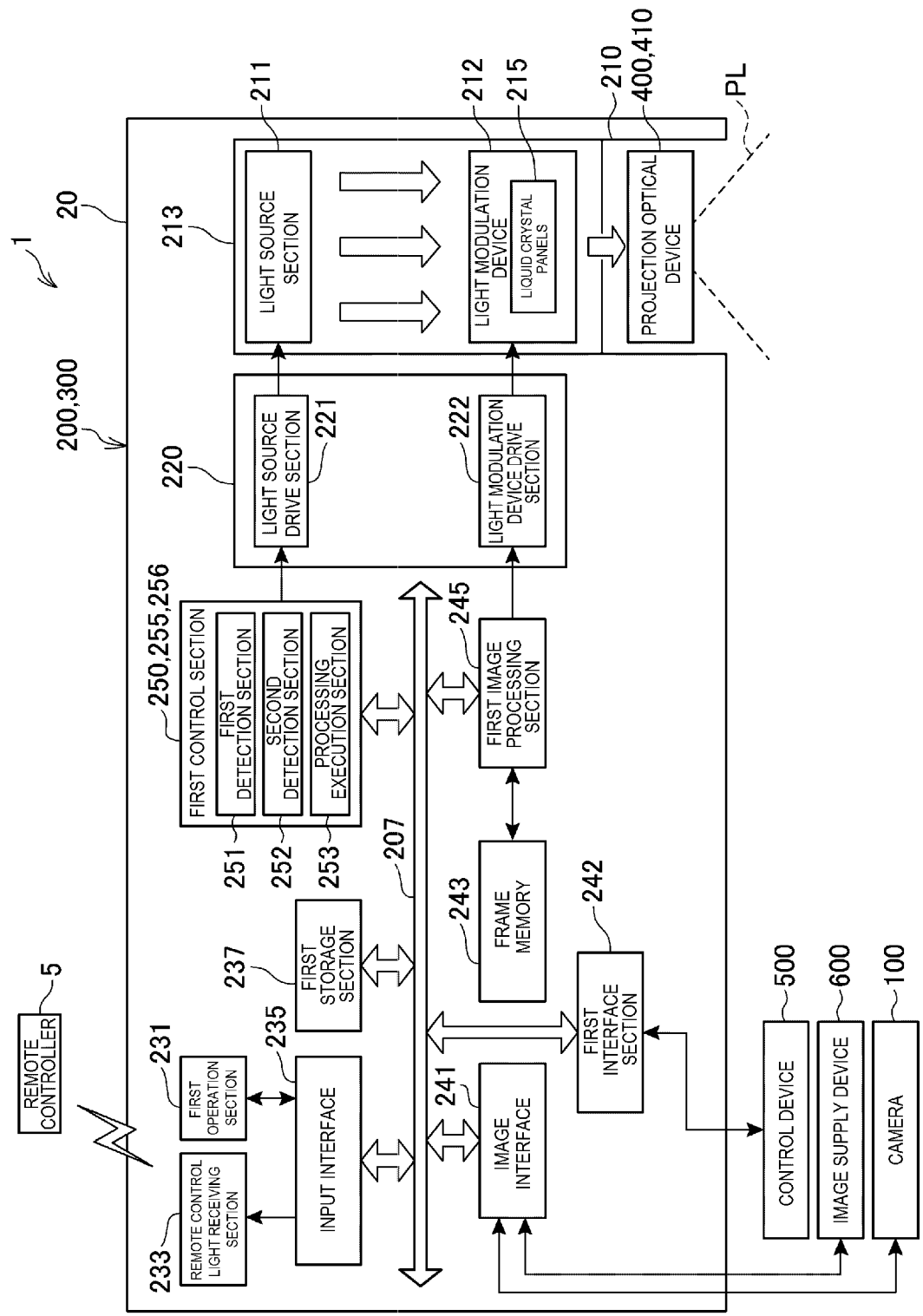
FIG. 3 is a diagram showing an example of a configuration of a projector according to the embodiment.

FIG. 3 is a diagram showing an example of a configuration of each of the projector 200 and the projector 300 according to the present embodiment.

The projector 200 and the projector 300 have respective configurations substantially the same as each other. The projector 200 and the projector 300 are each provided with the projector main body 20 and a remote controller 5.

There is adopted a configuration in which the projection optical device 400 and the projection optical device 410 can detachably be attached to the projector main body 20. In the projector 200, the projection optical device 400 is attached to the projector main body 20, and in the projector 300, the projection optical device 410 is attached to the projector main body 20.

There is adopted a configuration in which the camera 100 can detachably be attached to the projector 200 and the projector 300. In the projector 200, the camera 100 is installed in the camera attachment part 260 shown in FIG. 1. In the projector 300, the camera 100 is installed in the camera attachment part 911 shown in FIG. 2.

The projector main body 20 is provided with a chassis EN shown in FIG. 1 and FIG. 2, a first control section 250 housed in the chassis EN, the mounting part 210 on which the projection optical device 400 and the projection optical device 410 are mounted, an optical unit 213, and a drive section 220 for driving the optical unit 213. The optical unit 213 performs formation of optical image to generate the image light beam PL.

There is adopted a configuration in which the projection optical device 400 and the projection optical device 410 can detachably be attached to the mounting part 210. Specifically, in the display system 1 in the first state shown in FIG. 1, the projection optical device 400 is mounted on the mounting part 210. In the display system 1A in the second state shown in FIG. 2, the projection optical device 410 is mounted on the mounting part 210.

The optical unit 213 is provided with a light source section 211 and a light modulation device 212. The drive section 220 is provided with a light source drive section 221 and a light modulation device drive section 222.

The light source section 211 is provided with a lamp such as a halogen lamp, a xenon lamp, or a super-high pressure mercury lamp, or a solid-state light source such as an LED (Light Emitting Diode) or a laser source.

Further, the light source section 211 can also be provided with a reflector for guiding the light emitted by the light source to the light modulation device 212, and an auxiliary reflector. Further, the light source section 211 can also be provided with a lens group for improving the optical characteristics of the projection light, a polarization plate, a dimming element for reducing the light intensity of the light emitted by the light source on a path leading to the light modulation device 212, or the like.

The light source drive section 221 is coupled to a first internal bus 207, and puts the light source of the light source section 211 on and off in accordance with instructions of the first control section 250 similarly coupled to the first internal bus 207.

The light modulation device 212 is provided with three liquid crystal panels 215 corresponding respectively to, for example, the three primary colors of R, G, and B. The character R represents red, the character G represents green, and the character B represents blue. In other words, the light modulation device 212 is provided with the liquid crystal panel 215 corresponding to the R colored light, the liquid crystal panel 215 corresponding to the G colored light, and the liquid crystal panel 215 corresponding to the B colored light.

The light emitted by the light source section 211 is separated into colored light beams of the three colors of R, G, and B, and the colored light beams respectively enter the corresponding liquid crystal panels 215. The three liquid crystal panels 215 are each a transmissive liquid crystal panel, and each modulate the transmitted light to generate the image light beam PL. The image light beams PL having passed through the respective liquid crystal panels 215 to thereby be modulated are combined with each other by a combining optical system such as a cross dichroic prism, and are then emitted to the optical unit 213.

Although there is described when the light modulation device 212 is provided with the liquid crystal panel 215 of a transmissive type as the light modulation element in the present embodiment, the embodiment of the present disclosure is not limited thereto. The light modulation element can be a reflective liquid crystal panel, or can also be a digital micromirror device (Digital Micromirror Device).

The light modulation device 212 is driven by the light modulation device drive section 222. The light modulation device drive section 222 is coupled to a first image processing section 245.

To the light modulation device drive section 222, there are input image data corresponding to the respective primary colors of R, G, and B from the first image processing section 245. The light modulation device drive section 222 converts the image data input thereto into a data signal suitable for the operation of the liquid crystal panel 215. The light modulation device drive section 222 applies a voltage to each pixel of each of the liquid crystal panels 215 based on the data signal thus converted to thereby draw an image on each of the liquid crystal panels 215.

The projection optical device 400 and the projection optical device 410 are each provided with a lens, a mirror, or the like for focusing the image light beams PL having entered the projection optical device on the screen SC. Further, it is also possible for each of the projection optical device 400 and the projection optical device 410 to be provided with a zoom mechanism for expanding or contracting the image to be projected on the screen SC, a focus adjustment mechanism for performing an adjustment of the focus, and so on.

The projection optical device 400 projects the image light beams PL along the incident direction. The projection optical device 410 bends to project the image light beams PL for the purpose of shortening the focal length.

The projector main body 20 is further provided with a first operation section 231, a remote control light receiving section 233, an input interface 235, a first storage section 237, an image interface 241, a frame memory 243, the first image processing section 245, and the first control section 250. The input interface 235, the first storage section 237, the image interface 241, the first image processing section 245, and the first control section 250 are coupled to each other so as to be able to achieve data communication with each other via the first internal bus 207.

The first operation section 231 is provided with a variety of buttons and switches disposed on the surface of the chassis EN of the projector main body 20, and generates an operation signal corresponding to these buttons and switches to output the operation signal to the input interface 235. The input interface 235 is a circuit for outputting the operation signal input from the first operation section 231 to the first control section 250.

The remote control light receiving section 233 receives an infrared signal transmitted from the remote controller 5, and then decodes the infrared signal thus received to generate the operation signal. The remote control light receiving section 233 outputs the operation signal thus generated to the input interface 235. The input interface 235 is a circuit for outputting the operation signal input from the remote control light receiving section 233 to the first control section 250.

The first storage section 237 is a nonvolatile storage device such as a hard disk drive or an SSD (Solid-State Drive). The first storage section 237 stores a control program to be executed by the first control section 250, data having been processed by the first control section 250, the image data, and so on.

The image interface 241 is provided with a connector and an interface circuit, and is configured to be able to be coupled with wire to the image supply device 600 for supplying the projector 200 and the projector 300 with the image data.

In the present embodiment, the image interface 241 is an interface circuit for exchanging the image data and so on with the image supply device 600 in compliance with, for example, the USB standard. Further, the image interface 241 is an interface circuit for exchanging the image data and so on with the camera 100 in compliance with, for example, the USB standard.

A first interface section 242 is a communication interface for performing the communication with the control device 500 in compliance with the Ethernet (registered trademark) standard. The first interface section 242 is provided with a connector to which the Ethernet (registered trademark) cable is coupled, and an interface circuit for processing a signal transmitted through the connector.

The first interface section 242 is an interface board having the connector and the interface circuit, and is coupled to a main board on which a first processor 255 and so on of the first control section 250 are mounted. Alternatively, the connector and the interface circuit constituting the first interface section 242 are mounted on the main board of the first control section 250. The first interface section 242 receives, for example, a variety of types of configuration information and a variety of types of instruction information from the control device 500.

The first control section 250 is provided with a first memory 256 and the first processor 255.

The first memory 256 is a storage device for storing programs to be executed by the first processor 255 and data in a nonvolatile manner. The first memory 256 is formed of a magnetic storage device, a semiconductor storage element such as a flash ROM, or other types of nonvolatile storage device. Further, the first memory 256 can also include a RAM (Random Access Memory) constituting a work area for the first processor 255. The first memory 256 stores data to be processed by the first control section 250, a first control program to be executed by the first processor 255, and the image data.

By the first processor 255 executing the first control program, the first control section 250 controls the operations of the respective sections of the projector 200 and the projector 300.

For example, the first control section 250 generates the image light beams PL corresponding to the image supplied from the image supply device 600 via the image interface 241.

Further, for example, the first control section 250 adjusts the image light beams PL based on the imaging data supplied from the camera 100 via the image interface 241.

The first processor 255 can be constituted by a single processor, or it is also possible to adopt a configuration in which a plurality of processors functions as the first processor 255. The first processor 255 executes the first control program to control each of the sections of the projector 200 or the projector 300. For example, the first processor 255 outputs an execution instruction of the image processing corresponding to the operation received by the first operation section 231 or the remote controller 5, and parameters to be used in the image processing to the first image processing section 245. The parameters include, for example, geometric correction parameters for correcting a geometric distortion of the image to be projected on the screen SC. Further, the first processor 255 controls the light source drive section 221 to control lighting and extinction of the light source section 211, and further controls the luminance of the light source section 211.

The first image processing section 245 and the frame memory 243 can be formed of, for example, an integrated circuit. The integrated circuit includes an LSI, an ASIC (Application Specific Integrated Circuit), or a PLD (Programmable Logic Device). The PLD includes, for example, an FPGA (Field-Programmable Gate Array). Further, it is also possible for an analog circuit to be included in a part of the configuration of the integrated circuit, or it is also possible to adopt a combination of the processor and the integrated circuit. The combination of the processor and the integrated circuit is called a micro-controller unit (MCU), an SoC (System-on-a-chip), a system LSI, a chip set, and so on.

The image data input from the image supply device 600 via the image interface 241 is developed in the frame memory 243 by the first image processing section 245. The frame memory 243 is provided with a plurality of banks. Each of the banks has a storage capacity sufficient for writing the image data corresponding to one frame. The frame memory 243 is formed of, for example, an SDRAM (Synchronous Dynamic Random Access Memory).

The first image processing section 245 performs image processing such as a resolution conversion process, a resizing process, correction of a distortion aberration, a shape correction process, a digital zoom process, or an adjustment of tint and luminance of the image with respect to the image data developed in the frame memory 243.

Further, the first image processing section 245 generates a vertical sync signal obtained by converting the input frame frequency of the vertical sync signal into a drawing frequency. The vertical sync signal thus generated is referred to as an output sync signal. The first image processing section 245 outputs the output sync signal thus generated to the light modulation device drive section 222.

The first control section 250 is provided with a first detection section 251, a second detection section 252, and a processing execution section 253. Specifically, the first processor 255 executes the first control program to thereby function as the first detection section 251, the second detection section 252, and the processing execution section 253.

The first detection section 251 detects whether or not the camera 100 is attached to the camera attachment part 911 of the projection optical device 410.

For example, the camera attachment part 911 is provided with a switch or an electric contact. The first detection section 251 detects whether or not the camera 100 is attached to the camera attachment part 911 of the projection optical device 410 based on a signal from the switch or the electric contact provided to the camera attachment part 911. It is possible for the first detection section 251 to detect the fact that the projection optical device 410 is mounted on the projector main body 20 to thereby detect the fact that the camera 100 is attached to the projector 300.

The camera attachment part 911 will be described later with reference to FIG. 6.

The second detection section 252 detects whether or not the camera 100 is mounted on the camera attachment part 260 of the projector main body 20.

For example, the camera attachment part 260 is provided with a switch or an electric contact. The second detection section 252 detects whether or not the camera 100 is attached to the camera attachment part 260 of the projector main body 20 based on a signal from the switch or the electric contact provided to the camera attachment part 260. It is possible for the second detection section 252 to detect the fact that the projection optical device 400 is mounted on the projector main body 20 to thereby detect the fact that the camera 100 is attached to the projector 200.

The camera attachment part 260 will be described later with reference to FIG. 4.

The processing execution section 253 controls the operation of each of the camera mounted on the camera attachment part 911 or the camera attachment part 260, and the projector 200 or the projector 300 based on the detection result of the first detection section 251 and the detection result of the second detection section 252.

For example, the processing execution section 253 makes the projector 200 or the projector 300 project the image light beams PL toward the screen SC, then makes the camera 100 attached to the camera attachment part 911 or the camera attachment part 260 take the projection image P displayed on the screen SC to thereby generate the taken image. Then, the processing execution section 253 obtains the taken image generated by the camera 100, and then adjusts the image light beams PL based on the taken image to thereby adjust the position, the size, the color, the luminance, and so on of the projection image P.

The projection image P is, for example, a pattern image. The pattern image is, for example, a solid pattern with a specific color. The specific color is, for example, a white color.

3. Configuration of Camera Attachment Part and Camera

Figure 4:
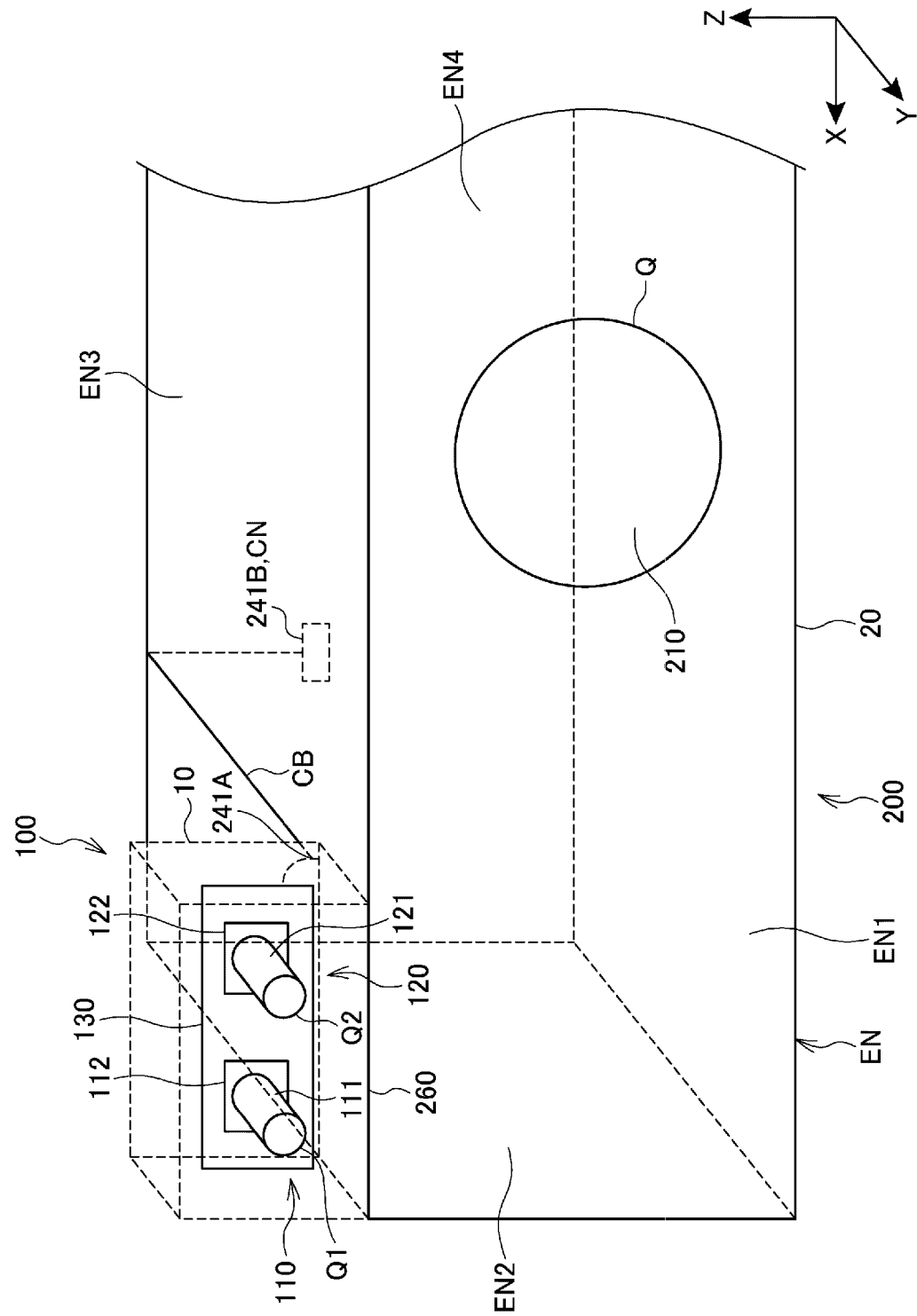
FIG. 4 is a diagram showing an example of an arrangement of a camera to the projector in the first state.

FIG. 4 is a diagram showing an example of a configuration of the camera attachment part 260 of the projector main body 20 and the camera 100.

The camera attachment part 260 is configured so that the camera 100 can detachably be attached. The camera attachment part 260 is provided to the projector main body 20.

The projector main body 20 is provided with the chassis EN. The chassis EN houses the optical unit 213, the drive section 220, the first operation section 231, the remote control light receiving section 233, the input interface 235, the first storage section 237, the image interface 241, the frame memory 243, the first image processing section 245, and the first control section 250 shown in FIG. 3. The chassis EN is formed to have a rectangular solid shape.

The chassis EN is provided with a front-surface chassis EN1, a side-surface chassis EN2, an upper-surface chassis EN3, and a rear-surface chassis EN4. In the front-surface chasses EN1, there is formed an opening Q for mounting part 210. The opening Q allows the image light beams PL from the optical unit 213 to pass therethrough. Further, to the opening Q, there is inserted the projection optical device 400 in the first state, and there is inserted the projection optical device 410 in the second state.

In the first state, the camera attachment part 260 is disposed in the front-right corner part of the upper-surface chassis EN3. There is adopted a configuration in which the camera 100 can detachably be attached to the camera attachment part 260.

The camera attachment part 260 is provided with, for example, a screw hole not shown, and by screwing a bolt not shown into the screw hole, the camera 100 is fixed to the camera attachment part 260.

The rear-surface chassis EN4 is provided with the connector 241B. The connector 241B constitutes the image interface 241 shown in FIG. 3. In other words, the connector 241B is coupled to the first control section 250 via the interface circuit so as to be able to communicate with the first control section 250. The connector 241B is a connector compliant with, for example, the USB standard.

When the camera 100 is mounted on the camera attachment part 260, a connector CN disposed in an end part of the USB cable CB coupled to the camera 100 is coupled to the connector 241B.

The USB cable CB gets out from the rear surface side of the camera 100, namely the negative direction side in the Y axis, to the outside of the chassis EN to be disposed along the Y-axis direction on the upper-surface chassis EN3, and is further disposed along the Z-axis direction on the rear-surface chassis EN4 to be coupled to the connector 241A.

The upper-surface chassis EN3 and the rear-surface chassis EN4 are each provided with a support member not shown for detachably supporting the USB cable CB.

4. Configuration of Camera Attachment Part and Projection Optical Device

Figure 5:
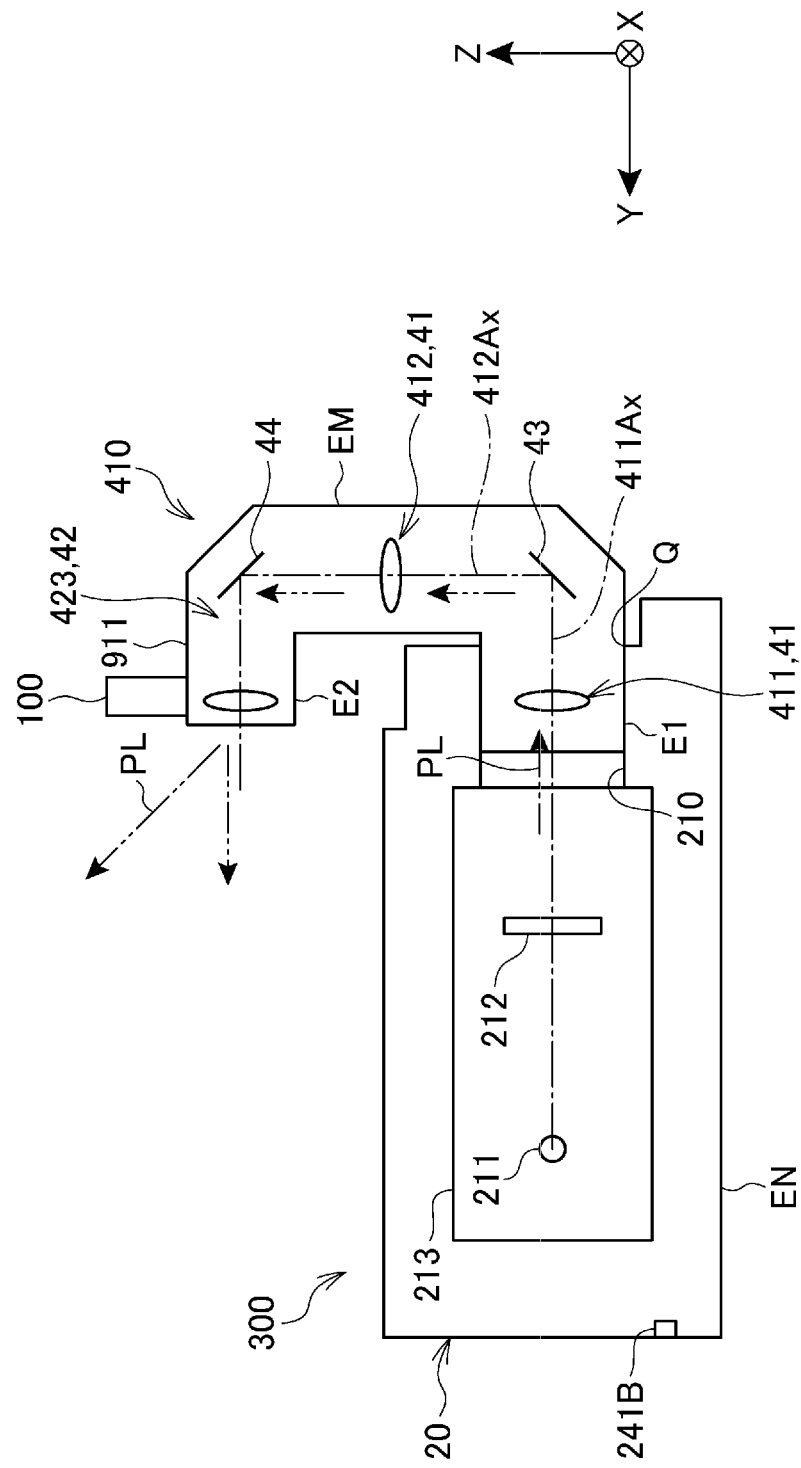
FIG. 5 is a diagram showing an example of an arrangement of the camera to the projector in the second state.

FIG. 5 is a diagram showing an example of a configuration of the projection optical device 410.

The projection optical device 410 is configured to be able to detachably be attached to the projector main body 20. FIG. 5 shows the projector 300 having the projection optical device 410 mounted on the projector main body 20. The projector 300 shown in FIG. 5 constitutes the display system 1A in the second state shown in FIG. 2.

The projection optical device 410 is formed to have a U-shape, wherein a first end part E1 representing an end part on one side is inserted into the opening Q provided to the chassis EN of the projector main body 20, and thus, the projection optical device 410 is mounted on the projector main body 20 so as to be opposed to the optical unit. The image light beams PL are projected on the screen SC from the projection opening of a second end part E2 representing an end part on the other side of the projection optical device 410.

As shown in FIG. 5, the projection optical device 410 is provided with a first optical system 41, a second optical system 42, a first mirror 43, a second mirror 44, and a chassis EM. The chassis EM houses the first optical system 41, the second optical system 42, the first mirror 43, and the second mirror 44. The chassis EM is formed to have a U-shape.

The first optical system 41 forms an intermediate image. The first optical system 41 is provided with a first lens group 411 and a second lens group 412. The light emitted from the optical unit 213 of the projector main body 20 enters the first lens group 411. The second lens group 412 has an optical axis 412Ax crossing an optical axis 411Ax of the first lens group 411.

In the present embodiment, the optical axis 411Ax is parallel to the Y axis, and the optical axis 412Ax is parallel to the Z axis. It should be noted that in FIG. 5, each of the first lens group 411, the second lens group 412, and a third lens group 423 is represented by a single lens for the sake of convenience.

The first mirror 43 is disposed on the light path between the first lens group 411 and the second lens group 412, namely inside the first optical system 41. The light transmitted through the first lens group 411 is reflected by the first mirror 43 toward the second lens group 412. In other words, the light transmitted through the first lens group 411 is reflected by the first mirror 43 toward the positive direction in the Z axis, namely upward.

The second mirror 44 is disposed between the first optical system 41 and the second optical system 42, and reflects the light having been transmitted through the second lens group 412 toward the positive direction in the Y axis.

The second optical system 42 enlarges the intermediate image. The second optical system 42 is provided with the first lens group 423. The third lens group 423 is disposed along an optical axis 42Ax crossing the optical axis 412Ax.

In the present embodiment, the optical axis 42Ax is parallel to, for example, the Y axis.

The first lens group 411, the second lens group 412, and the third lens group 423 each correspond to an example of a "projection lens group."

The optical unit 213 housed in the chassis EN of the projector main body 20 is provided with the light source section 211 and the light modulation device 212, and emits the image light beams PL in the negative direction in the Y axis. The image light beams PL are transmitted through the first lens group 411 of the projection optical device 410, then reflected by the first mirror 43, and then proceed toward the positive direction in the Z axis. Then, the image light beams PL reflected by the first mirror 43 are transmitted through the second lens group 412 to form the intermediate image. Further, the image light beams PL having been transmitted through the second lens group 412 are reflected by the second mirror 44, and then proceed toward the positive direction in the Y axis. Then, the image light beams PL having been reflected by the second mirror 44 are transmitted through the third lens group 423, and are then projected on the screen SC to form the projection image P on the screen SC.

In other words, the projection optical device 410 has a light path having a U-shape extending in sequence via the first lens group 411, the first mirror 43, the second lens group 412, the second mirror 44, and the third lens group 423.

The light path of the projection optical device 410 corresponds to an example of a "second light path."

It should be noted that the description of the configuration of the projection optical device 400 is omitted, but the projection optical device 400 has a linear light path. The linear light path of the projection optical device 400 corresponds to an example of a "first light path."

On the upper surface of the second end part E2 of the chassis EM, there is disposed the camera attachment part 911. In other words, the camera attachment part 911 is disposed in the chassis EM of the projection optical device 410 at the side from which the image light beams PL are projected. The side from which the image light beams PL are projected corresponds to the second end part E2 of the chassis EM. Further, the camera attachment part 911 is disposed in the chassis EM of the projection optical device 410 at the side distant from the projector main body 20. The side distant from the projector main body 20 represents the positive direction side in the Z axis in the second end part E2 of the chassis EM, namely the upper side in FIG. 5.

On the camera attachment part 911, there is disposed the camera 100 so as to take the projection image P formed on the screen SC disposed on the positive direction side in the Y axis. In other words, the camera 100 is disposed on the camera attachment part 911 so that each of the first lens 111 and the second lens 121 faces to the positive direction in the Y axis. The positive direction in the Y axis represents the front direction in FIG. 2.

When the camera 100 is mounted on the camera attachment part 911, the imaging range of the camera 100 includes at least apart of the projection image P derived from the image light beams PL projected by the projection optical device 410. Specifically, when the camera 100 is mounted on the camera attachment part 911, at least one of an imaging range of a first imaging section 110 and an imaging range of a second imaging section 120 includes at least a part of the projection image P derived from the image light beams PL projected by the projection optical device 410.

Figure 6:
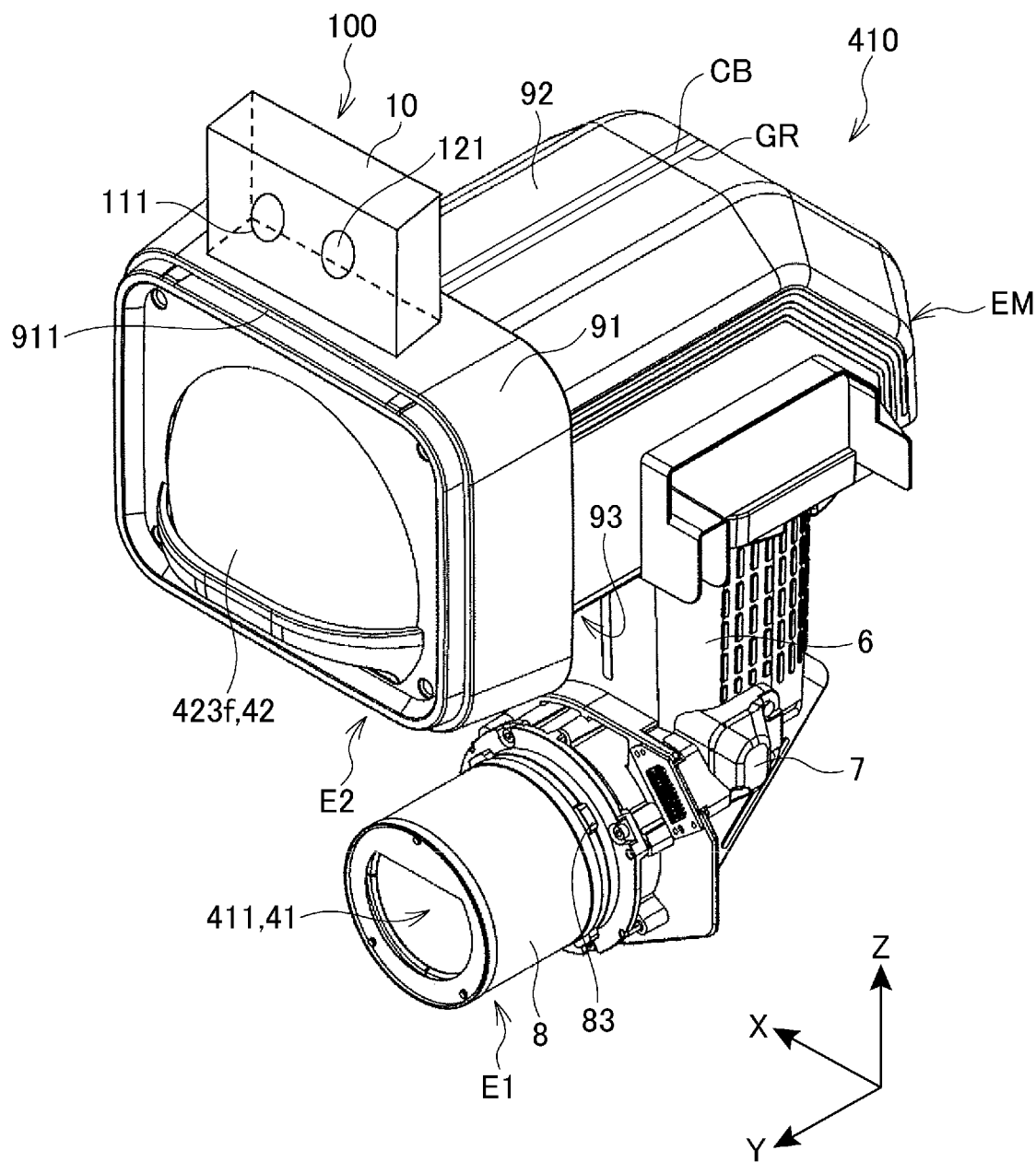
FIG. 6 is a perspective view showing an example of a configuration of a projection optical device.

FIG. 6 is a perspective view showing an example of a configuration of the projection optical device 410.

The camera attachment part 911 is provided to the chassis EM of the projection optical device 410. FIG. 6 shows an appearance of the projection optical device 410.

As shown in FIG. 6, the chassis EM is provided with a first cover 91, a second cover 92, a third cover 93, a first holding member 6, a second holding member 7, and an attachment cover 8.

The first cover 91 is disposed in the second end part E2. The first cover 91 houses an exit side lens 423f. The exit side lens 423f represents a lens disposed on the downstream-most side, namely at the end in the positive direction in the Y axis, out of the third lens group 423 shown in FIG. 5. The first cover 91 is formed to have a rectangular cylindrical shape.

The second cover 92 and the third cover 93 house the third lens group 423 and the second mirror 44 shown in FIG. 5. Each of the second cover 92 and the third cover 93 is disposed on the negative direction side in the Y axis with respect to the first cover 91, and is coupled to the first cover 91. The second cover 92 is coupled to the third cover 93, and thus, the second cover 92 and the third cover 93 are formed to have a rectangular cylindrical shape.

The second cover 92 is disposed so as to cover the upper side, namely the positive direction side in the Z axis, of the third lens group 423 and the second mirror 44.

The third cover 93 is disposed so as to cover the lower side, namely the negative direction side in the Z axis, of the third lens group 423 and the second mirror 44.

The first holding member 6 houses the second lens group 412 of the first optical system 41 shown in FIG. 5. The first holding member 6 is formed to have a rectangular cylindrical shape. An upper end of the first holding member 6 is coupled to a lower end of each of the second cover 92 and the third cover 93.

The second holding member 7 houses the first mirror 43 shown in FIG. 5. The second holding member 7 is disposed between the first holding member 6 and the attachment cover 8. The lower end of the first holding member 6 is coupled to the second holding member 7, and the rear end, namely the end in the negative direction in the Y axis, of the attachment cover 8 is coupled to the second holding member 7.

The attachment cover 8 is disposed in the first end part E1. The attachment cover 8 houses the first lens group 411 of the first optical system 41 shown in FIG. 6. The attachment cover 8 is formed to have a circular cylindrical shape. At the rear end of the attachment cover 8, namely the end in the negative direction in the Y axis, there is formed a plurality of protrusions 83.

By the first end part E1 being inserted into the opening Q of the mounting part 210 of the projector main body 20, the projection optical device 410 is attached to the projector main body 20.

Each of the protrusions 83 is formed so as to protrude outward from the outer circumferential surface of the attachment cover 8. The protrusions 83 are engaged with a retaining mechanism not shown of the projector main body 20. In other words, by the plurality of protrusions 83 being engaged with the retaining mechanism not shown of the projector main body 20, the projection optical device 410 is attached to the projector main body 20.

The camera attachment part 911 is disposed on an upper surface of the first cover 91. The camera attachment part 911 is configured so that the camera 100 can detachably be attached.

The camera attachment part 911 is provided with a screw hole not shown, and by screwing a bolt not shown into the screw hole, the camera 100 is fixed to the camera attachment part 911.

The camera 100 is attached to the camera attachment part 911 so that the first lens 111 and the second lens 121 face to the positive direction in the Y axis.

The USB cable CB coupled to the camera 100 is fitted into, for example, a groove part GR provided to the chassis EM. The groove part GR is formed on an upper surface of the second cover 92. Further, the groove part is also formed on a rear surface, namely a surface on the negative direction side in the Y axis, of the first holding member 6. An upper end of the groove part formed on the rear surface of the first holding member 6 is coupled to the groove part GR.

When mounting the camera 100 on the camera attachment part 911, the user executes the following procedure. First, by screwing a bolt into a screw hole provided to the camera attachment part 911, the camera 100 is fixed to the camera attachment part 911. Then, the USB cable CB coming out from the rear side of the camera 100 is disposed in the groove part GR along the Y-axis direction. Further, the USB cable CB is disposed on the front-surface chassis EN1 toward the positive direction in the Z axis, the USB cable CB is disposed on the upper-surface chassis EN3 toward the negative direction in the Y axis, and thus, the connector CN disposed at the end part of the USB cable CB is coupled to the connector 241B.

When detaching the camera 100 from the camera attachment part 911, the user executes an opposite procedure to the procedure when mounting the camera 100 on the camera attachment part 911.

5. Configuration of Camera

Going back to FIG. 4, the configuration of the camera 100 will be described.

As shown in FIG. 4, the camera 100 is provided with the chassis EN, the first imaging section 110, the second imaging section 120, and a control board 130. The chassis EN houses the first imaging section 110, the second imaging section 120, and the control board 130. The chassis EN is formed to have a rectangular solid shape. On the front side of the chassis EN, there are formed an opening Q1 and an opening part Q2.

The first imaging section 110 is provided with the first lens 111 and a first imaging element 112.

The first lens 111 is, for example, a so-called zoom lens. In other words, the first lens 111 adjusts the largeness of the imaging range. The first lens 111 is disposed so as to be inserted through the opening Q1.

The first imaging element 112 is formed of a CCD (Charge Coupled Device), a CMOS (Complementary MOS), or the like to generate the image signal. The image signal is transmitted to an output circuit 150 disposed on the control board 130.

The second imaging section 120 is provided with the second lens 121 and a second imaging element 122.

The second lens 121 is, for example, a so-called wide lens. In other words, the second lens 121 is a lens broader in field angle than a standard lens. The standard lens represents a lens having the field angle of about 46 degrees, and the focal length of about 50 mm. The second lens 121 is disposed so as to be inserted through the opening Q2.

The second imaging element 122 is formed of a CCD or a CMOS to generate the image signal. The image signal is transmitted to an output circuit 150 disposed on the control board 130.

The control board 130 and the output circuit 150 will be described later in detail with reference to FIG. 5.

On the camera attachment part 260, there is disposed the camera 100 so as to take the projection image P formed on the screen SC disposed on the positive direction side in the Y axis. In other words, the camera 100 is disposed on the camera attachment part 260 so that the first lens 111 and the second lens 121 face to the positive direction side in the Y axis. The positive direction side in the Y axis represents the front side in FIG. 1.

When the camera 100 is mounted on the camera attachment part 260, the imaging range of the camera 100 includes at least apart of the projection image P derived from the image light beams PL of the projector 200. Specifically, when the camera 100 is mounted on the camera attachment part 260, at least one of the imaging range of the first imaging section 110 and the imaging range of the second imaging section 120 includes at least a part of the projection image P derived from the image light beams PL of the projector 200.

The camera 100 is configured so as to be able to detachably be attached to the camera attachment part 260.

When mounting the camera 100 on the camera attachment part 260, the user executes the following procedure. First, by screwing a bolt into a screw hole provided to the camera attachment part 260, the camera 100 is fixed to the camera attachment part 260. Then, the USB cable CB coming out from the rear side of the camera 100 is disposed on the upper-surface chassis EN3 along the Y-axis direction. Further, the USB cable CB is disposed on the rear-surface chassis EN4 along the Z-axis direction, and then the connector CN disposed in the end part of the USB cable CB is coupled to the connector 241B.

When detaching the camera 100 from the camera attachment part 260, the user executes an opposite procedure to the procedure when mounting the camera 100 on the camera attachment part 260.

Although in the present embodiment, the camera 100 is provided with the first imaging section 110 and the second imaging section 120, the embodiment of the present disclosure is not limited thereto. It is sufficient for the camera 100 to be provided with at least one imaging section. For example, it is possible for the camera 100 to be provided with the first imaging section 110 without being provided with the second imaging section 120. Further, it is possible for the camera 100 to be provided with the second imaging section 120 without being provided with the first imaging section 110.

Figure 7:
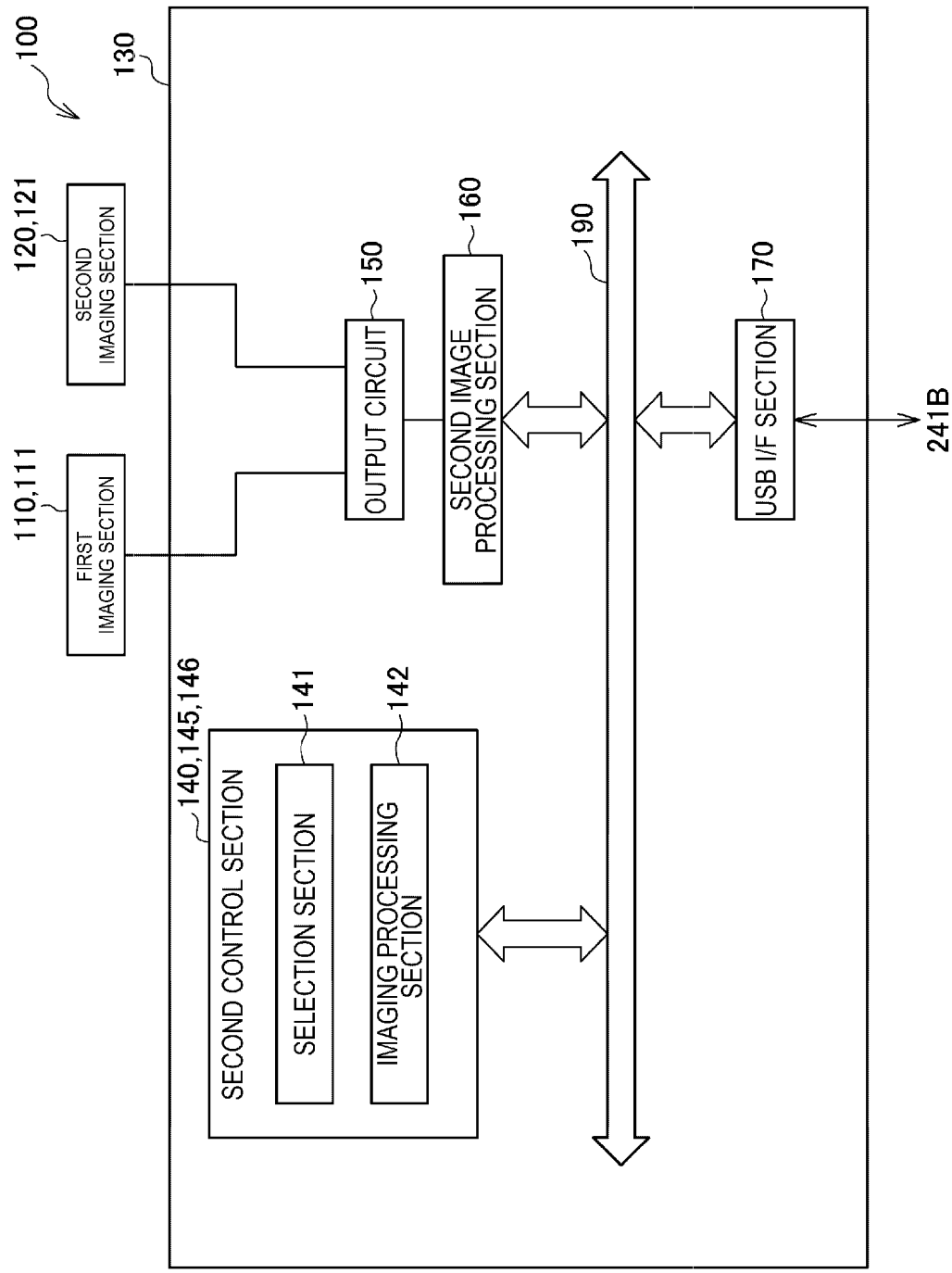
FIG. 7 is a diagram showing an example of a configuration of the camera.

FIG. 7 is a diagram showing an example of the configuration of the camera 100.

As shown in FIG. 7, on the control board 130, there are disposed a second control section 140, the output circuit 150, a second image processing section 160, and a USB interface (USB I/F) section 170. A second internal bus 190 couples the second control section 140, the second image processing section 160, and the USB interface section 170 so as to be able to communicate with each other.

The second control section 140 is provided with a second memory 146 and a second processor 145 to control each of the sections of the camera 100.

The second memory 146 is a storage device for storing programs to be executed by the second processor 145 and data in a nonvolatile manner. The second memory 146 is formed of a magnetic storage device, a semiconductor storage element such as a flash ROM, or other types of nonvolatile storage device. Further, the second memory 146 can also include a RAM constituting a work area for the second processor 145. The second memory 146 stores data to be processed by the second control section 140 and a second control program to be executed by the second processor 145.

The second processor 145 can be constituted by a single processor, or it is also possible to adopt a configuration in which a plurality of processors functions as the second processor 145. The second processor 145 executes the second control program to control each of the sections of the camera 100. For example, the second processor 145 transmits the image data representing the image taken by each of the first imaging section 110 and the second imaging section 120 to the projector 200 and the projector 300 via the USB interface section 170.

The USB interface section 170 is an interface circuit for exchanging control data, the image data, and so on with external equipment in compliance with the USB standard. In the embodiment of the present disclosure, the USB interface section 170 is coupled to the connector 241A of the image interface 241 of the projector 200 or the projector 300.

The output circuit 150 transmits the taken image data input from the first imaging section 110 and the second imaging section 120 to the second image processing section 160. Specifically, the output circuit 150 transmits the taken image data of the first imaging section 110 or the second imaging section 120 to the image processing section 160 in accordance with the control data input from the second control section 140.

The second image processing section 160 is coupled to the first imaging section 110 and the second imaging section 120, and drives each of the first imaging section 110 and the second imaging section 120 in accordance with the control data input from the second control section 140. Further, the second image processing section 160 executes the image processing such as conversion of the format of the taken image data output by the output circuit 150 into a format of image data which the second control section 140 can process, and then outputs the data thus converted to the second control section 140.

The control data input from the second control section 140 to the second image processing section 160 can be made as, for example, the control data for instructing the execution of the focus adjustment, and the control data for designating optical zoom magnification. When the control data for instructing the execution of the focus adjustment is input from the second control section 140, the second image processing section 160 determines the focusing state based on the taken image data output by the output circuit 150, and then outputs the drive signal to the first imaging section 110 or the second imaging section 120.

The second image processing section 160 performs the image processing such as edge detection or contrast measurement on the taken image data to determine the focusing state of the first imaging section 110 or the second imaging section 120.

The second control section 140 transmits the image data to the projector 200 via the USB interface section 170 in the present embodiment, but the embodiment of the present disclosure is not limited thereto. The interface for establishing the connection to the projector 200 can also be an analog interface such as VGA, D-terminal, or S-terminal. Further, the interface for establishing the connection to the projector 200 can also be a digital interface such as DVI, HDMI (registered trademark), Display Port, or HDBaseT (registered trademark). Further, the interface for establishing the connection to the projector 200 can be a communication interface such as Ethernet (registered trademark) or IEEE 1394.

Further, it is possible for the second control section 140 to transmit the image data to the projector 200 or the projector 300 via wireless communication such as Wi-Fi (registered trademark).

It should be noted that it is preferable for the projector 200 or the projector 300 and the camera 100 to be coupled to each other so that the projector 200 or the projector 300 can supply the camera 100 with the power. In other words, it is preferable for the projector 200 or the projector 300 and the camera 100 to be coupled to each other with the USB interface or Ethernet (registered trademark).

The second control section 140 of the camera 100 is provided with a selection section 141 and an imaging processing section 142. Specifically, the second processor 145 of the second control section 140 executes the second control program stored in the second memory 146 to thereby function as the selection section 141 and the image processing section 142.

The selection section 141 selects one of the first imaging section 110 and the second imaging section 120 as the imaging section for outputting the taken image data. For example, the selection section 141 selects one of the first imaging section 110 and the second imaging section 120 as the imaging section for outputting the taken image data in accordance with an instruction from the projector 200 or the projector 300.

The imaging processing section 142 executes the processing corresponding to the instruction from the projector 200 or the projector 300.

For example, when the imaging processing section 142 has received an image transmission instruction from the projector 200 or the projector 300, the imaging processing section 142 executes imaging of the projection image P displayed on the screen SC from the projector 200 or the projector 300, and then transmits the taken image information to the projector 200.

The image transmission instruction is an instruction representing an operation of executing imaging of the projection image P and then transmitting the taken image information to the projector 200 or the projector 300.

6. Operations of Projector and Camera

Then, operations of the projector 200, the projector 300, and the camera 100 will be described with reference to FIG. 8 and FIG. 9.

Figure 8:
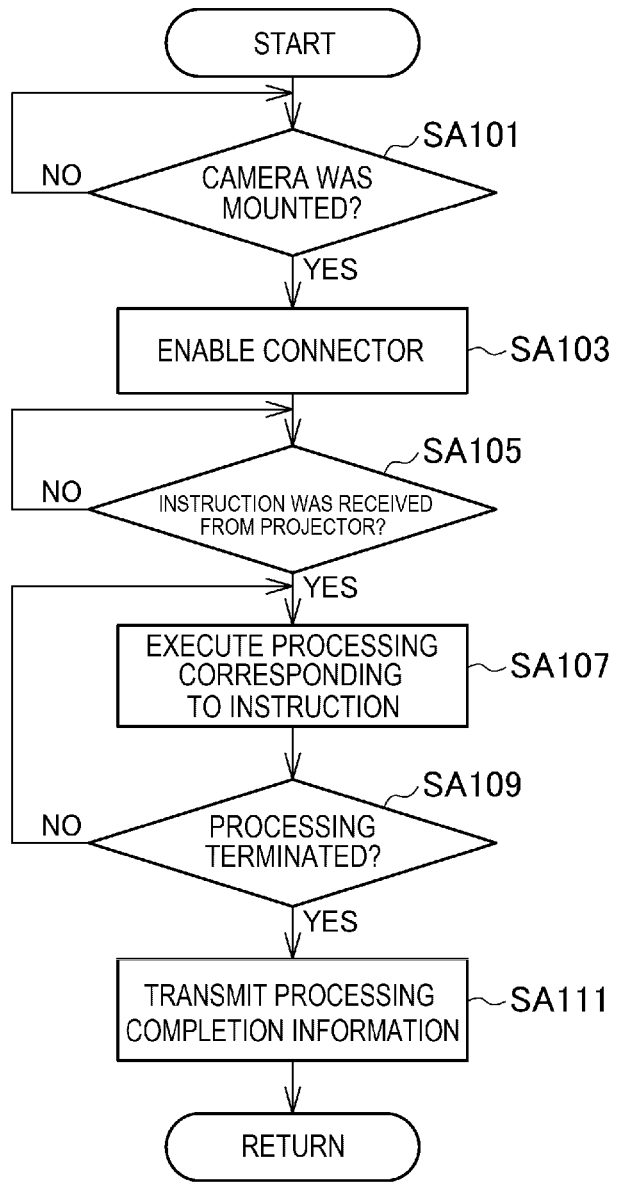
FIG. 8 is a flowchart showing an example of an operation of the camera.

FIG. 8 is a flowchart showing an example of the operation of the camera 100.

First, in the step SA101, the camera 100 determines whether or not the camera 100 is mounted on the projector main body 20 based on whether or not the power is supplied from the projector 200 or the projector 300. For example, when the power is supplied from the projector 200 or the projector 300, the second control section 140 determines that the camera 100 is mounted on the projector main body 20, and when the power is not supplied from the projector 200 or the projector 300, the second control section 140 determines that the camera 100 is not mounted on the projector main body 20.

When the second control section 140 has determined that the camera 100 is not mounted on the projector main body 20 (NO in the step SA101), the process gets into a standby state. When the second control section 140 has determined that the camera 100 is mounted on the projector main body 20 (YES in the step SA101), the process proceeds to the step SA103.

Then, in the step SA103, the second control section 140 enables the connector CN. In other words, the second control section 140 sets the connector CN so that the information is transmitted/received via the connector CN. For example, by coupling the connector CN and the connector 241B of the projector 200 or the projector 300 to each other, the power is supplied from the projector 200 or the projector 300, and the communication connection of the connector CN is enabled.

Then, in the step SA105, the second control section 140 determines whether or not the instruction from the projector 200 or the projector 300 has been received.

When the second control section 140 has determined that the instruction from the projector 200 or the projector 300 is not received (NO in the step SA105), the process gets into the standby state. When the second control section 140 has determined that the instruction from the projector 200 or the projector 300 has been received (YES in the step SA105), the process proceeds to the step SA107.

Then, in the step SA107, the second control section 140 executes the processing corresponding to the instruction from the projector 200.

When the second control section 140 has received the instruction of, for example, selecting the imaging section for outputting the taken image data, the selection section 141 selects one of the first imaging section 110 and the second imaging section 120 as the imaging section for outputting the taken image data in accordance with the instruction from the projector 200.

When the second control section 140 has received, for example, an image transmission instruction, the imaging processing section 142 executes imaging of the projection image P displayed on the screen SC from the projector 200 or the projector 300, and then transmits the taken image information to the projector 200 or the projector 300.

Then, in the step SA109, the second control section 140 determines whether or not the process of the selection section 141 or the imaging processing section 142 has terminated.

When it is determined that the process of the selection section 141 or the imaging processing section 142 has not terminated (NO in the step SA109), the process returns to the step SA107. When it is determined that the process of the selection section 141 or the imaging processing section 142 has terminated (YES in the step SA109), the process proceeds to the step SA111.

Then, in the step SA111, the second control section 140 transmits processing completion information representing the fact that the processing corresponding to the instruction from the projector 200 or the projector 300 has been completed to the projector 200 or the projector 300. Subsequently, the process returns to the step SA101.

Figure 9:
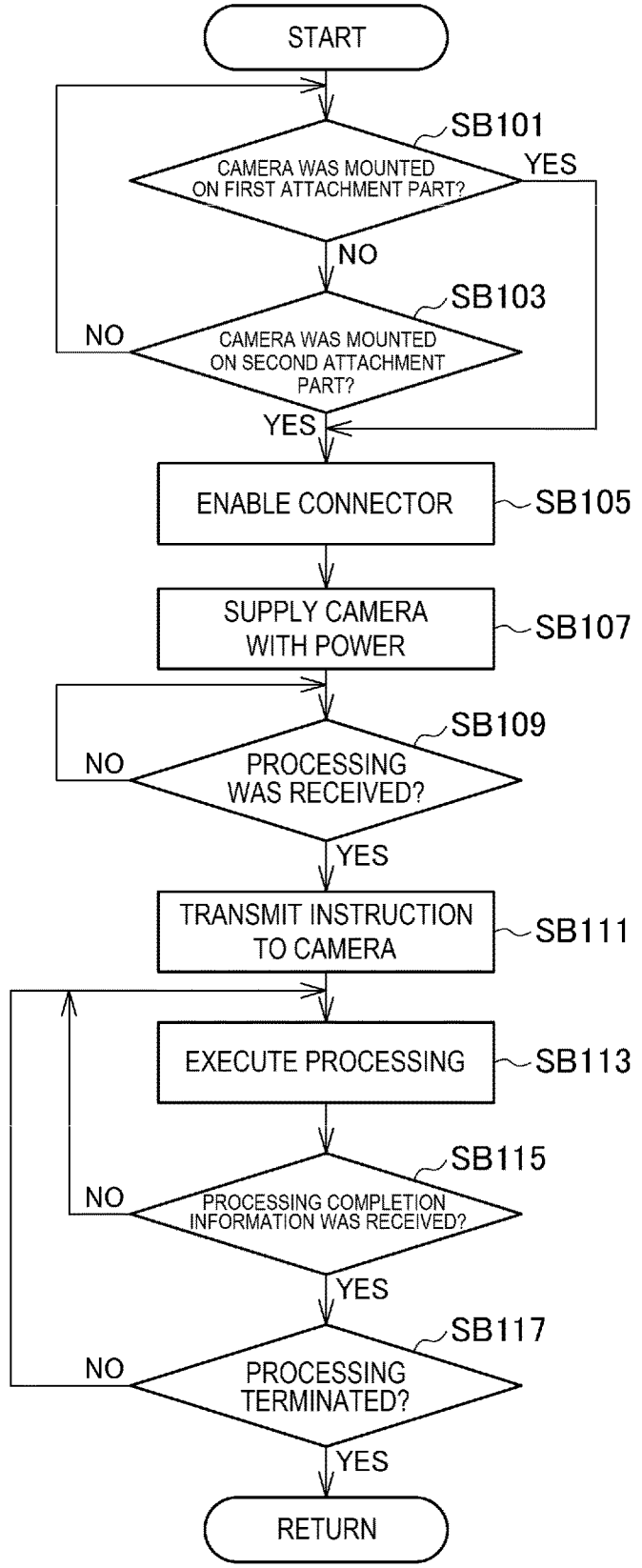
FIG. 9 is a flowchart showing an example of an operation of the projector.

FIG. 9 is a flowchart showing an example of the operation of the projector 200 or the projector 300.

As shown in FIG. 9, in the step SB101, the first detection section 251 determines whether or not the camera 100 is mounted on the camera attachment part 911 of the projection optical device 410.

When the first detection section 251 has determined that the camera 100 is mounted on the camera attachment part 911 of the projection optical device 410 (YES in the step SB101), the process proceeds to the step SB105. When the first detection section 251 has determined that the camera 100 is not mounted on the camera attachment part 911 of the projection optical device 410 (NO in the step SB101), the process proceeds to the step SB103.

Then, in the step SB103, the second detection section 252 determines whether or not the camera 100 is mounted on the camera attachment part 260 of the projector main body 20.

When the second detection section 252 has determined that the camera 100 is not mounted on the camera attachment part 260 of the projector main body 20 (NO in the step SB103), the process returns to the step SB101. When the second detection section 252 has determined that the camera 100 is mounted on the camera attachment part 260 of the projector main body 20 (YES in the step SB103), the process proceeds to the step SB105.

Then, in the step SB105, the first control section 250 enables the connector 241B. In other words, the first control section 250 sets the connector 241B so that the information is transmitted/received via the connector 241B. Further, the first control section 250 sets the connector 241B so that the power is supplied via the connector 241B.

Then, in the step SB107, the first control section 250 supplies the power to the camera 100 from the projector 200 or the projector 300. Specifically, the projector 200 or the projector 300 supplies the camera 100 with the power via the connector 241B and the connector CN.

Then, in the step SB109, the first control section 250 determines whether or not an operation of instructing a process has been received from the remote controller 5 or the first operation section 231.

When the first control section 250 has determined that the operation of instructing a process has not been received from the remote controller 5 or the first operation section 231 (NO in the step SB109), the process gets into the standby state. When the first control section 250 has determined that the operation of instructing a process has been received from the remote controller 5 or the first operation section 231 (YES in the step SB109), the process proceeds to the step SB111.

Then, in the step SB111, the first control section 250 transmits the instruction corresponding to the process received in the step SB109 to the camera 100.

Then, in the step SB113, the processing execution section 253 executes the process received in the step SB109.

For example, the processing execution section 253 projects the image light beams PL from the projector 200 or the projector 300 toward the screen SC, then makes the camera 100 take the projection image P displayed on the screen SC to thereby generate the taken image. Then, the processing execution section 253 obtains the taken image generated by the camera 100, and then adjusts the image light beams PL based on the taken image to thereby adjust the position, the size, the color, the luminance, and so on of the projection image P.

Then, in the step SB115, the first control section 250 determines whether or not the processing completion information has been received from the camera 100. The processing completion information represents the fact that the processing corresponding to the instruction transmitted by the first control section 250 to the camera 100 in the step SB111 has been completed.

When the first control section 250 has determined that the processing completion information has not been received from the camera 100 (NO in the step SB115), the process returns to the step SB113. When the first control section 250 has determined that the processing completion information has been received from the camera 100 (YES in the step SB115), the process proceeds to the step SB117.

Then, in the step SB117, the first control section 250 determines whether or not the processing received in the step SB109 has terminated.

When the first control section 250 has determined that the processing has not terminated (NO in the step SB117), the process returns to the step SB113. When the first control section 250 has determined that the processing has terminated (YES in the step SB117), the process returns to the step SB101.

7. Embodiment of Present Disclosure and Functions/Advantages

As described hereinabove with reference to FIG. 1 through FIG. 9, the projector 200, 300 according to the present embodiment is provided with the projector main body 20 provided with the optical unit 213 for generating the image light beams PL, and the projection optical device 400, 410 mounted on the mounting part 210 of the projector main body 20 and configured to project the image light beams PL generated in the optical unit 213 on the screen SC, the chassis EM of the projection optical device 400, 410 is provided with the camera attachment part 911 on which the camera 100 is mounted, and the imaging range of the camera 100 mounted on the camera attachment part 911 includes at least a part of the projection image P projected by the projection optical device 400, 410.

In other words, the chassis EM of the projection optical device 400, 410 is provided with the camera attachment part 911 on which the camera 100 is mounted, and the imaging range of the camera 100 mounted on the camera attachment part 911 includes at least a part of the projection image P projected by the projection optical device 400, 410. Therefore, when the projection optical device 400, 410 is mounted on the projector main body 20, it is possible to execute the adjustment of the projection image P using the taken image by the camera 100 mounted on the camera attachment part 911.

Further, the projection optical device 400, 410 is configured to be able to detachably be attached to the projector main body 20.

In other words, the projection optical device 400, 410 for projecting the image light beams PL is configured to be able to detachably be attached to the projector main body 20. Therefore, by mounting the projection optical device 400, 410, it is possible to project the image light beams PL.

Further, the projection optical device 400, 410 includes the projection optical device 400 and the projection optical device 410, the projection optical device 400 has the first light path, the projection optical device 410 has the second light path different from the first light path, and when the projection optical device 400 is mounted on the projector main body 20, the projection optical device 400 projects the image light beams PL in the first direction D1, and when the projection optical device 410 is mounted on the projector main body 20, the projection optical device 410 projects the image light beams PL in the second direction D2 different from the first direction D1.

In other words, when the projection optical device 400 is mounted on the projector main body 20, the projection optical device 400 projects the image light beams PL in the first direction D1, and when the projection optical device 410 is mounted on the projector main body 20, the projection optical device 410 projects the image light PL in the second direction D1 different from the first direction D1. Therefore, by mounting the projection optical device 400 on the projector main body 20, it is possible to project the image light beams PL in the first direction D1, and by mounting the projection optical device 410 on the projector main body 20, it is possible to project the image light beams PL in the second direction D2. Therefore, by changing the projection optical device to be mounted on the projector main body 20, it is possible to change the projection direction of the image light beams PL. For example, by changing the projection optical device to be mounted on the projector main body 20 from the projection optical device 400 to the projection optical device 410, it is possible to change the projection direction of the image light beams PL from the first direction D1 to the second direction D2.

Further, the camera attachment part 911 is configured so that the camera 100 can detachably be attached.

Therefore, it is possible to detach the camera 100 from the camera attachment part 911 and then mount the camera 100 on another position such as the camera attachment part 260. Therefore, even when the projection optical device 410 is detached from the projector main body 20, it is possible to make use of the camera 100.

Further, the camera attachment part 911 is disposed in the chassis EM of the projection optical device 400, 410 at the side from which the image light beams PL are projected.

Therefore, it is possible to prevent the chassis EM from being included in the image area of the camera 100 compared to when the camera 100 is disposed in another position of the chassis EM of the projection optical device 400, 410, for example, a central part in the projection direction in the chassis EM of the projection optical device 400, 410. Therefore, it is possible for the camera 100 to take the projection image P.

Further, the camera attachment part 911 is disposed in the chassis EM of the projection optical device 400, 410 at the side distant from the projector main body 20.

Therefore, it is possible to prevent the projector main body 20 from becoming an obstacle when the user attaches or detaches the camera 100 to or from the camera attachment part 911. Therefore, it is possible for the user to easily mount the camera 100 on the camera attachment part 911, and to easily detach the camera 100 from the camera attachment part 911.

Further, the projector main body 20 is provided with the camera attachment part 260 to which the camera 100 is attached, and the imaging area of the camera 100 attached to the camera attachment part 260 includes at least a part of the projection image P derived from the image light beams PL projected by the projection optical device 400, 410.

In other words, the imaging area of the camera 100 attached to the camera attachment part 260 includes at least a part of the projection image P derived from the image light beams PL projected by the projection optical device 400, 410. Therefore, it is possible to execute the adjustment of the projection image P using the taken image by the camera 100 mounted on the camera attachment part 260.

The projection optical device 400, 410 according to the embodiment of the present disclosure is the projection optical device 400, 410 which is mounted on the mounting part 210 of the projector main body 20 provided with the optical unit 213 for generating the image light beams PL, and projects the image light beams PL generated by the optical unit 213 on the screen SC, the chassis EM of the projection optical device 400, 410 is provided with the camera attachment part 911 on which the camera 100 is mounted, and the imaging range of the camera 100 mounted on the camera attachment part 911 includes at least a part of the projection image P projected by the projection optical device 400, 410.

Therefore, since the imaging range of the camera 100 mounted on the camera attachment part 911 includes at least a part of the projection image P projected by the projection optical device 400, 410, by mounting the camera 100 on the camera attachment part 911, it is possible for the camera 100 to take the projection image P. Therefore, it is possible for the projector 200, 300 to execute the adjustment of the projection image P using the taken image by the camera 100.

A method of controlling the projector 200, 300 according to the embodiment of the present disclosure is a method of controlling the projector 200, 300 provided with the projector main body 20 including the optical unit 213 for generating the image light beams PL, and the projection optical device 400, 410 mounted on the mounting part 210 of the projector main body 20 and configured to project the image light beams PL generated in the optical unit 213 on the screen SC, wherein when the camera 100 is attached to the camera attachment part 911 of the chassis EM of the projection optical device 400, 410, the camera 100 is made to image a range including at least a part of the projection image P projected by the projection optical device 400, 410, and the image light beams PL projected from the projection optical device 400, 410 are adjusted based on the taken image by the camera 100.

In other words, when the camera 100 is attached to the camera attachment part 911 of the chassis EM of the projection optical device 400, 410, the camera 100 is made to image the range including at least a part of the projection image P projected by the projection optical device 400, 410, and then the image light beams PL projected from the projection optical device 400, 410 are adjusted based on the taken image by the camera 100. Therefore, when the projection optical device 400, 410 is mounted on the projector main body 20, it is possible to execute the adjustment of the projection image P using the taken image by the camera 100 mounted on the camera attachment part 911.

8. Other Embodiments

The present embodiment described above is a preferred embodiment. It should be noted that the embodiment described above is not a limitation, but a variety of modified implementation are possible within the scope or the spirit.

In the present embodiment, there is described when the "imaging device" is configured as the camera 100, but the embodiment of the present disclosure is not limited thereto. It is sufficient for the "imaging device" to be provided with at least one of the first imaging section 110 and the second imaging section 120, and the second control section 140.

In the present embodiment, the projection optical device 410 has the U-shaped light path, but the embodiment of the present disclosure is not limited thereto. It is sufficient for the projection optical device 410 to project the image light beams PL in the second direction different from the first direction D1. For example, it is possible for the projection optical device 410 to have an L-shaped light path.

In the present embodiment, the camera attachment part 911 is provided to the projection optical device 410, but the embodiment of the present disclosure is not limited thereto. It is sufficient for the camera attachment part 911 to be provided to the projection optical device. For example, it is possible for the camera attachment part 911 to be provided to the projection optical device 400.

In the present embodiment, the camera attachment part 911 is configured so that the camera 100 can detachably be attached, but the embodiment of the present disclosure is not limited thereto. It is sufficient for the camera attachment part 911 to be attached with the camera 100. For example, it is possible for the camera attachment part 911 and the camera 100 to integrally be configured. In other words, it is possible for the first cover 91 of the projection optical device 410 and the camera 100 to integrally be configured.

In the present embodiment, the camera attachment part 260 is configured so that the camera 100 can detachably be attached, but the embodiment of the present disclosure is not limited thereto. It is sufficient for the camera attachment part 260 to be attached with the camera 100. For example, it is possible for the camera attachment part 260 and the camera 100 to integrally be configured. In other words, it is possible for the projector 200 or the projector 300 and the camera 100 to integrally be configured.

In the present embodiment, the camera attachment part 260 is provided to the projector main body 20, but the embodiment of the present disclosure is not limited thereto. For example, it is possible to adopt a configuration in which the camera attachment part 260 is detachably provided to the projector main body 20 in a so-called adapter configuration. In this configuration, it is possible to simplify the configuration of the projector 200.

Further, each of the functional sections shown in each of FIG. 3 and FIG. 6 represents the functional configuration, and the specific implementation configuration is not particularly limited. In other words, it is not necessarily required to install the hardware individually corresponding to each of the functional sections, but it is obviously possible to adopt a configuration of realizing the functions of the plurality of functional sections by a single processor executing a program. Further, a part of the function realized by software in the embodiment described above can also be realized by hardware, or a part of the function realized by hardware can also be realized by software. Besides the above, the specific detailed configuration of each of other sections of each of the projector 200, the projector 300, and the camera 100 can arbitrarily be modified within the scope or the spirit.

Further, the processing units of the flowchart shown in each of FIG. 8 and FIG. 9 are obtained by dividing the process of the second control section 140 or the first control section 250 in accordance with the principal processing contents in order to make the process easy to understand. The way of division or the names of the processing units represented by the flowchart shown in each of FIG. 8 and FIG. 9 are not a limitation, and it is also possible to divide the process into a larger number of processing units, or it is also possible to divide the process so that one processing unit includes a larger amount of process in accordance with the processing contents. Further, the processing sequence of the flowchart described above is not limited to the illustrated example.

Further, it is possible to realize the method of controlling the projector 200 or the projector 300 by making the first processor 255 provided to the projector 200 or the projector 300 execute the first control program corresponding to the method of controlling the projector 200 or the projector 300. Further, it is also possible to record the first control program on a recording medium storing the first control program in a computer readable manner. As the recording medium, there can be used a magnetic or optical recording medium, or a semiconductor memory device. Specifically, there can be cited a portable or rigid recording medium such as a flexible disk, an HDD, a CD-ROM (Compact Disc Read Only Memory), a DVD, a Blu-ray (registered trademark) disc, a magneto-optical disc, a flash memory, or a card-type recording medium. Further, the recording medium can also be a RAM, or a nonvolatile storage device such as a ROM or the HDD as an internal storage device provided to the image processing device. Further, it is also possible to realize the method of controlling the projector 200 or the projector 300 by storing the first control program corresponding to the method of controlling the projector 200 or the projector 300 in a server device or the like in advance, and then downloading the first control program from the server device to the projector 200 or the projector 300.

What is claimed is:

1. A projector comprising:
   a projector main body including an optical unit configured to generate an image light beam;
   a projection optical device attached to a mounting part of the projector main body, and configured to project the image light beam generated by the optical unit on a projection surface; and
   a chassis of the projection optical device includes a first camera attachment to which a camera is attachable, wherein
   an imaging range of the camera when attached to the first camera attachment includes at least a part of a projection image projected by the projection optical device,
   the projection optical device includes a first projection optical device and a second projection optical device,
   the first projection optical device forms a first light path,
   the second projection optical device forms a second light path different from the first light path,
   the first projection optical device projects the image light beam in a first direction when the first projection optical device is attached to the projector main body, and
   the second projection optical device projects the image light beam in a second direction different from the first direction when the second projection optical device is attached to the projector main body.

2. The projector according to claim 1, wherein
   the projection optical device is configured to detachably be attached to the projector main body.

3. The projector according to claim 1, wherein
   the first camera attachment is configured so that the camera is detachably attached to the first camera attachment.

4. The projector according to claim 1, wherein
   the first camera attachment is disposed in the chassis of the projection optical device at a side from which the image light beam is projected.

5. The projector according to claim 1, wherein
   the first camera attachment is disposed in the chassis of the projection optical device at a side distant from the projector main body.

6. The projector according to claim 1, wherein
the projector main body includes a second camera attachment to which the camera is attachable, and
an imaging area of the camera when attached to the second camera attachment includes at least a part of the projection image derived from the image light beam projected by the projection optical device.

7. A projection optical device comprising:
an optical unit configured to generate an image light beam, and configured to project the image light beam generated by the optical unit on a projection surface; and
a chassis of the projection optical device includes a camera attachment to which a camera is attachable, wherein
the projection optical device is to be attached to a mounting part of a projector main body,
an imaging range of the camera when attached to the camera attachment includes at least a part of a projection image projected by the projection optical device,
the projection optical device includes a first projection optical device and a second projection optical device,
the first projection optical device forms a first light path,
the second projection optical device forms a second light path different from the first light path,
the first projection optical device projects the image light beam in a first direction when the first projection optical device is attached to the projector main body, and
the second projection optical device projects the image light beam in a second direction different from the first direction when the second projection optical device is attached to the projector main body.

8. A method of controlling a projector comprising:
making a camera attached to a camera attachment of a chassis of a projection optical device take an image of a range including at least a part of a projection image projected by the projection optical device when the camera is attached to the camera attachment; and
adjusting an image light projected from the projection optical device based on a taken image by the camera, wherein
the projector including a projector main body including an optical unit configured to generate an image light beam, and the projection optical device attached to a mounting part of the projector main body, and configured to project the image light beam generated by the optical unit on a projection surface,
the projection optical device includes a first projection optical device and a second projection optical device,
the first projection optical device forms a first light path,
the second projection optical device forms a second light path different from the first light path,
the first projection optical device projects the image light beam in a first direction when the first projection optical device is attached to the projector main body, and
the second projection optical device projects the image light beam in a second direction different from the first direction when the second projection optical device is attached to the projector main body.

9. The projection optical device according to claim 7, wherein
the projection optical device is configured to detachably be attached to the projector main body.

10. The projection optical device according to claim 7, wherein
the camera attachment is configured so that the camera is detachably attached to the camera attachment.

11. The projection optical device according to claim 7, wherein
the camera attachment is disposed in the chassis of the projection optical device at a side from which the image light beam is projected.

12. The projection optical device according to claim 7, wherein
the camera attachment is disposed in the chassis of the projection optical device at a side distant from the projector main body.

13. The projection optical device according to claim 7, wherein
the projector main body includes a second camera attachment to which the camera is attachable, and
an imaging area of the camera when attached to the second camera attachment includes at least a part of the projection image derived from the image light beam projected by the projection optical device.

14. The method of controlling a projector according to claim 8, wherein
the projection optical device is configured to detachably be attached to the projector main body.

15. The method of controlling a projector according to claim 8, wherein
the camera attachment is configured so that the camera is detachably attached to the camera attachment.

16. The method of controlling a projector according to claim 8, wherein
the camera attachment is disposed in the chassis of the projection optical device at a side from which the image light beam is projected.

17. The method of controlling a projector according to claim 8, wherein
the camera attachment is disposed in the chassis of the projection optical device at a side distant from the projector main body.

18. The method of controlling a projector according to claim 8, wherein
the projector main body includes a second camera attachment to which the camera is attachable, and
an imaging area of the camera when attached to the second camera attachment includes at least a part of the projection image derived from the image light beam projected by the projection optical device.

* * * * *